US006313985B1

United States Patent
Chen et al.

(10) Patent No.: US 6,313,985 B1
(45) Date of Patent: Nov. 6, 2001

(54) RAIL ASSEMBLY FOR A DATA STORAGE DEVICE

(75) Inventors: Yun-Long Chen, Chung-Ho; Tai-Yu Liu, Hsin-Chuang; Alvin Liu, Pa-Li, all of (TW)

(73) Assignee: Hon Hai Precision Ind. Co., Ltd., Taipei Hsien (TW)

( * ) Notice: Subject to any disclaimer, the term of this patent is extended or adjusted under 35 U.S.C. 154(b) by 0 days.

(21) Appl. No.: 09/533,093

(22) Filed: Mar. 22, 2000

(30) Foreign Application Priority Data

Feb. 2, 2000 (TW) .............................................. 089201911

(51) Int. Cl.[7] ..................................................... G06F 1/16
(52) U.S. Cl. ........................ 361/685; 361/727; 361/741; 361/756; 364/708.1; 312/334.7
(58) Field of Search ...................................... 361/681, 683, 361/685, 726–727, 747, 756, 730–732, 729, 753, 799; 312/223.1, 223.2, 216, 218, 251.1, 333, 330.1, 332.1, 334.4, 334.7, 334.17, 334.16; 369/77.2, 75.1, 77.1; 248/220.31, 226.8, 581, DIG. 9, 500, 611, 346.06, 229.16, 225.11, 220.22, 346.04, 222.12; 292/106.31, 101; 364/708.1

(56) References Cited

U.S. PATENT DOCUMENTS

| 4,979,909 | * | 12/1990 | Andrews | ............................... 439/352 |
|---|---|---|---|---|
| 5,142,447 | * | 8/1992 | Cooke et al. | ......................... 361/394 |
| 5,262,923 | * | 11/1993 | Batta et al. | ........................... 361/685 |
| 5,332,306 | * | 7/1994 | Babb et al. | ...................... 312/334.16 |
| 5,599,080 | * | 2/1997 | Ho | ..................................... 312/334.7 |
| 5,806,949 | * | 9/1998 | Johnson | ............................. 312/334.7 |
| 6,025,987 | * | 2/2000 | Allirot et al. | ........................ 361/685 |
| 6,172,870 | * | 1/2001 | Novotny | ............................... 361/685 |

* cited by examiner

Primary Examiner—Leo P. Picard
Assistant Examiner—Michael Datskovsky
(74) Attorney, Agent, or Firm—Wei Te Chung

(57) ABSTRACT

A rail assembly is adapted for mounting a data storage device in a computer enclosure. The rail assembly comprises a rail and a conductive fastener attached to the rail for fixing the rail to a data storage device. The rail comprises a body and a latch so connected with the body as to be capable of a flexing movement relative to the body for engaging with a computer enclosure. The body defines a number of pairs of through holes and a first slot. The fastener comprises a pair of tabs for engagingly extending into a selected pair of the through holes of the rail and a pair of posts for extending through the first slot of the rail to securely engaging with the data storage device. The fastener can mount the rail to the data storage device with the rail attached at a number of different positions relative to the data storage device.

17 Claims, 9 Drawing Sheets

RAIL ASSEMBLY FOR A DATA STORAGE DEVICE

BACKGROUND OF THE INVENTION

1. Field of the Invention

The present invention relates to a rail assembly for a data storage device of a computer, and particularly to a rail assembly which is easily fixed to and electrically contacts the data storage device.

2. Description of Prior Art

As the computer industry develops, improved manufacturing efficiency of products is sought to reduce costs. A data storage device, such as a hard disk drive, a floppy disk drive or a CD-ROM drive, is generally fixed in a drive bracket inside a computer enclosure by bolts. However, fixing a data storage device in a drive bracket using bolts is complicated and time-consuming. Furthermore, computer enclosures require more working space when mounting data storage devices in drive brackets using bolts.

To counter the problems caused by using bolts for fixing data storage devices in drive brackets, rails may be used in place of bolts for fixing the data storage device in the drive bracket. An example is disclosed in Taiwan Patent Application No. 78201813, wherein rails are attached to a data storage device by bolts, but this still involves a complicated assembly procedure. Another example is disclosed in Taiwan Patent Application No. 81207129, wherein rails are attached to a drive bracket using bolts. The procedure for fixing the rails to the drive brackets is complicated.

Additionally, electrostatic charges are easily built up on the casing of a data storage device during operation. Conventional rails attached to a data storage device for fixing the data storage device inside a computer enclosure are generally made of plastics. The plastic rails do not allow electrostatic discharge from the casing to the enclosure. Forming additional electrical paths to discharge the electrostatic charges on the data storage device is important as these charges can reduce or even damage the stability of the computer system.

Furthermore, computer enclosures are changing rapidly today, and a data storage device may be used in numerous computer enclosures during its useful life. Conventional rails are attached to a data storage device at fixed positions. The rail positions are only suited to one specific type of computer enclosure, which necessitates further costs and trouble when changing computer enclosures.

SUMMARY OF THE INVENTION

Accordingly, an object of the present invention is to provide a rail assembly for facilitating assembling a rail to a data storage device.

Another object of the present invention is to provide a rail assembly for facilitating assembling a data storage device to a drive bracket.

A further object of the present invention is to provide a rail assembly for attaching a data storage device to a drive bracket and simultaneously grounding the data storage device.

A further object of the present invention is to provide a rail assembly which is position-adjustable for fitting different designs of computer enclosures.

To fulfil the foregoing objects, a rail assembly of the present invention is adapted to mount a data storage device to a computer enclosure. The rail assembly comprises a rail and a fastener fixing the rail to a data storage device. The rail comprises a body to which a resiliently deformable latch is connected for releasably engaging with and thus securing the data storage device to a computer enclosure. The body defines a pair of through holes and a first slot. The fastener comprises a pair of tabs for selectively engaging with the through holes of the rail and a pair of posts for movably extending through the first slot of the rail to engage with and thus secure the rail to the data storage device.

BRIEF DESCRIPTION OF THE DRAWINGS

Other objects and advantages of the present invention will be understood from the following description of a rail assembly according to a preferred embodiment of the present invention shown in the accompanying drawings, in which.

DETAILED DESCRIPTION OF THE PREFERRED EMBODIMENT

A computer may comprise a data storage device such as a CD-ROM drive, a floppy disk drive and a hard disk drive, fixed in an enclosure for reading and storage of data. A rail assembly in accordance with the present invention is provided for being readily mounted to the data storage device to fix the data storage device in the enclosure. For simplification and illustration, a CD-ROM drive is taken as an example in the following description of a preferred embodiment of the present invention. It is, however, noted that the present invention may be equally applicable to other data storage devices.

Figure 1:
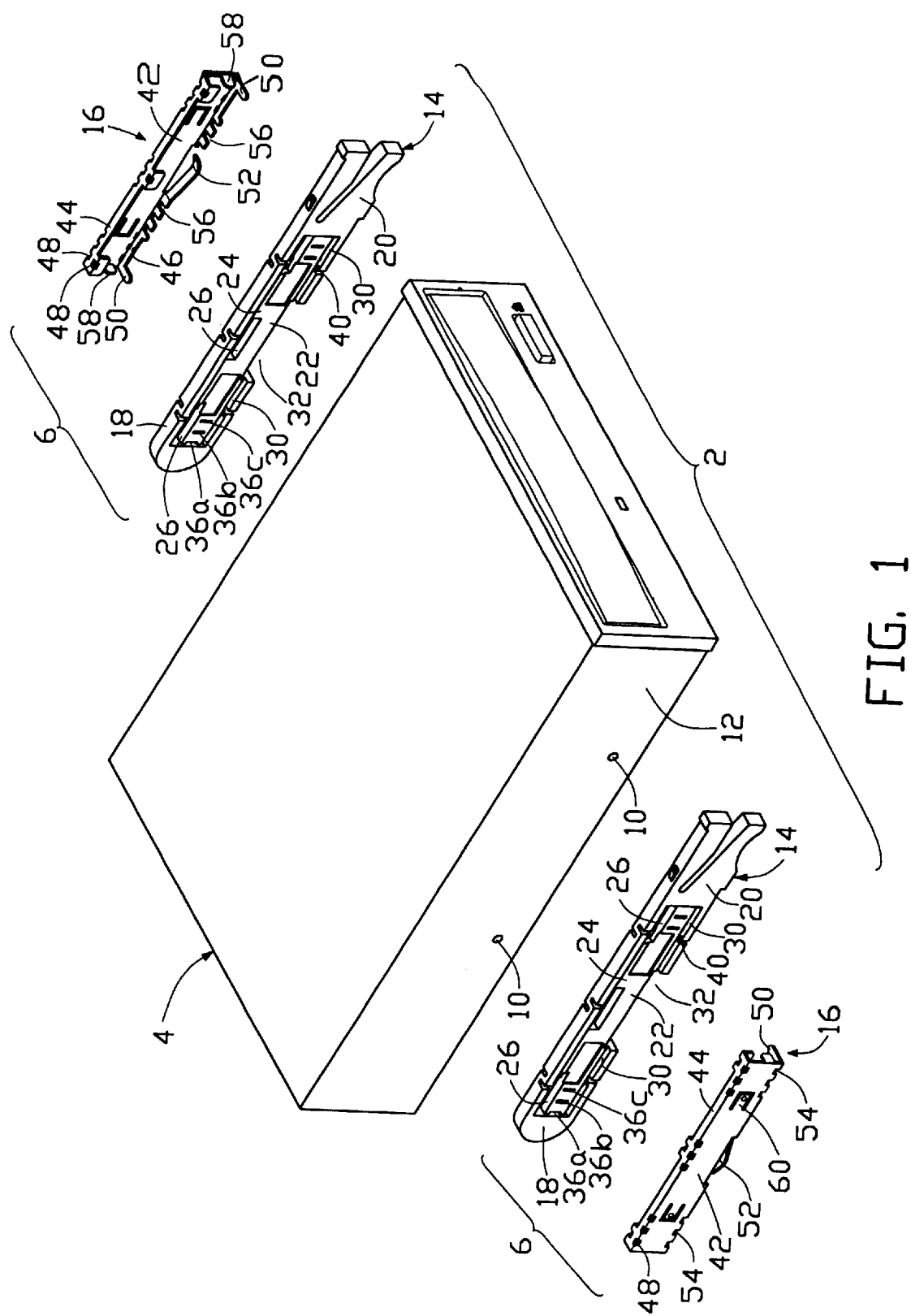
FIG. 1 is an exploded view of a CD-ROM drive assembly embodying the concepts of the present invention.
Figure 7:
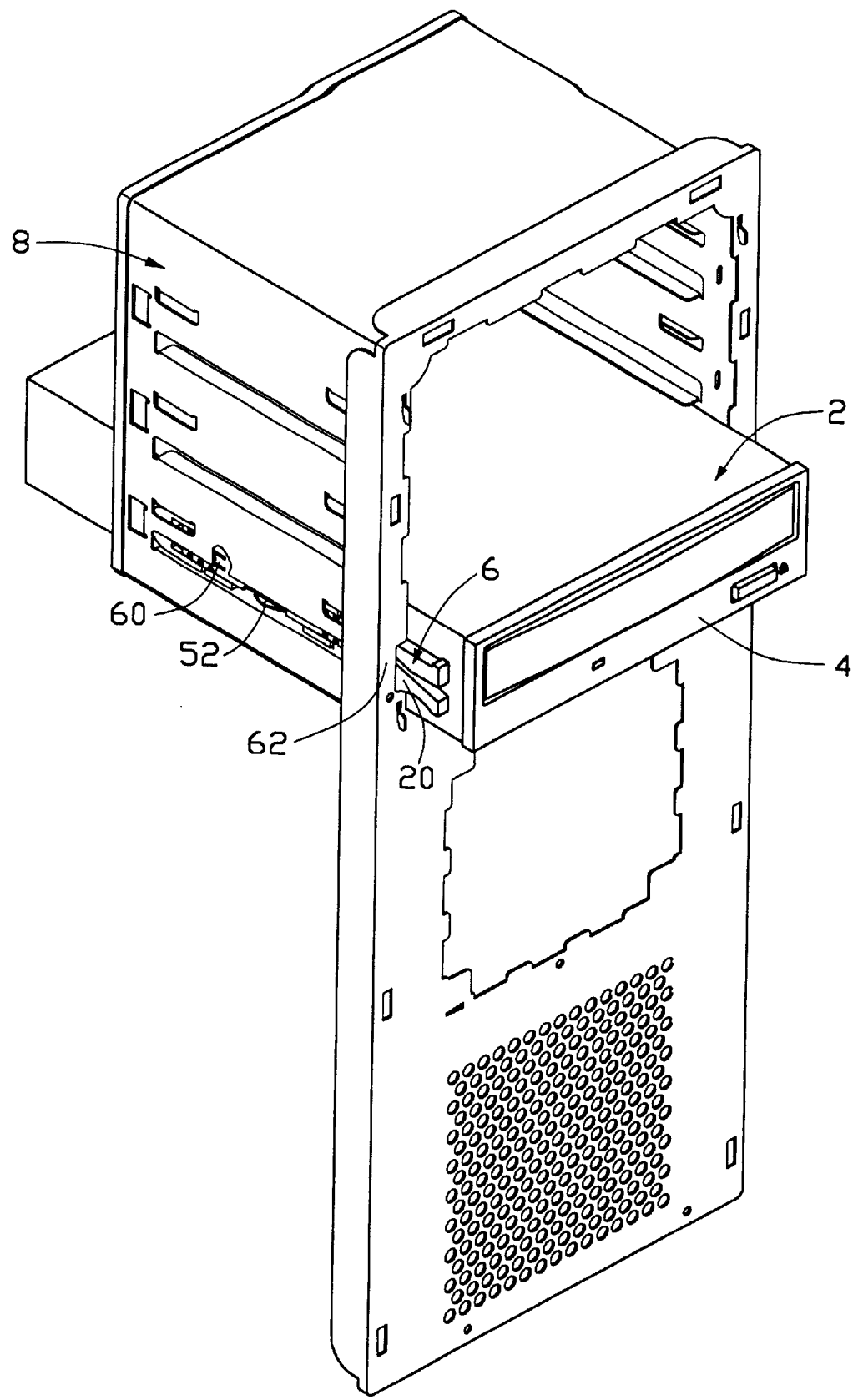
FIG. 7 is an assembled view of the CD-ROM drive assembly and a drive bracket showing the CD-ROM drive at a first position relatively to the drive bracket.

Referring to FIG. 1, a CD-ROM drive assembly 2 of the present invention comprises a CD-ROM drive 4 and a pair of rail assemblies 6 attached to opposite side walls 12 of the CD-ROM drive 4 for fixing the CD-ROM drive 4 to a drive bracket 8 (See FIG. 7). The CD-ROM drive 4 defines a pair of apertures 10 in each side wall 12.

Each rail assembly 6 includes a rail 14 and a conductive fastener 16 attached to the rail 14 for fixing the rail 14 to the CD-ROM drive 4. Each rail 14 includes a body 18 and a latch 20 connected with the body 18 and resiliently deformable for engaging with a computer enclosure (not shown) thereby securing the CD-ROM drive assembly 2 in the enclosure. The body 18 defines two opposite recesses 22 in opposite faces thereof to form a recessed wall 24 therebetween. The rail 14 and the fastener 16 are designed so that the fastener can be attached to either face of the rail 14.

Figure 2:
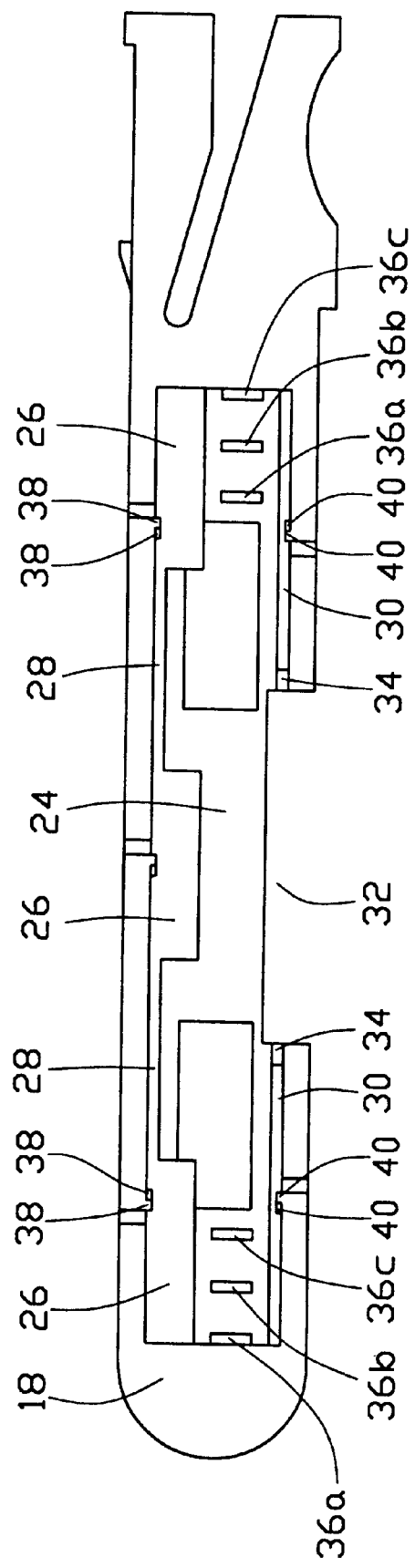
FIG. 2 is a side view of a rail of FIG. 1.

Also referring to FIG. 2, three openings 26 and a pair of top slots 28 in communication with the three openings 26 are defined in a top side of the recessed wall 24 in a line. A pair of bottom slots 30 is defined in a bottom side of the recessed wall 24. A cutout 32 is defined in a bottom side of the body 18 in communication with the recesses 22. A pair of partitions 34 is formed between the bottom slots 30 and the cutout 32. Three pairs of through holes 36a, 36b, 36c are defined in opposite ends of the recessed wall 24. Three pairs of top protrusions 38 extend from the top of the body 18 toward the recesses 22. Two pairs of bottom protrusions 40 extend from the bottom of the body 18 toward the recesses 22.

Each fastener 16 includes an elongate base 42 and top and bottom flanges 44, 46 extending from opposite edges of the elongate base 42. A plurality of top notches 48 is defined in the top flange 44 for alternatively engaging with the top protrusions 38 of the rail 14. A pair of posts 50 extends from opposite ends of the bottom flange 46. A resilient finger 52 is formed at a center of the bottom flange 46 for extending into the cutout 32 of the rail 14. A plurality of bottom notches 54 is defined in the bottom flange 46 for alternatively engaging with the bottom protrusions 40 of the rail 14. The bottom flange 46 defines a plurality of gaps 56 between the finger 52 and the posts 50 for alternatively engaging with the partitions 34 of the rail 14. A pair of tabs 58 extends from opposite ends of the elongate base 42 for alternatively extending through one pair of the through holes 36a, 36b, 36c of the rail 14. A pair of tongues 60 is formed on the elongate base 42 between the tabs 58.

Figure 3:
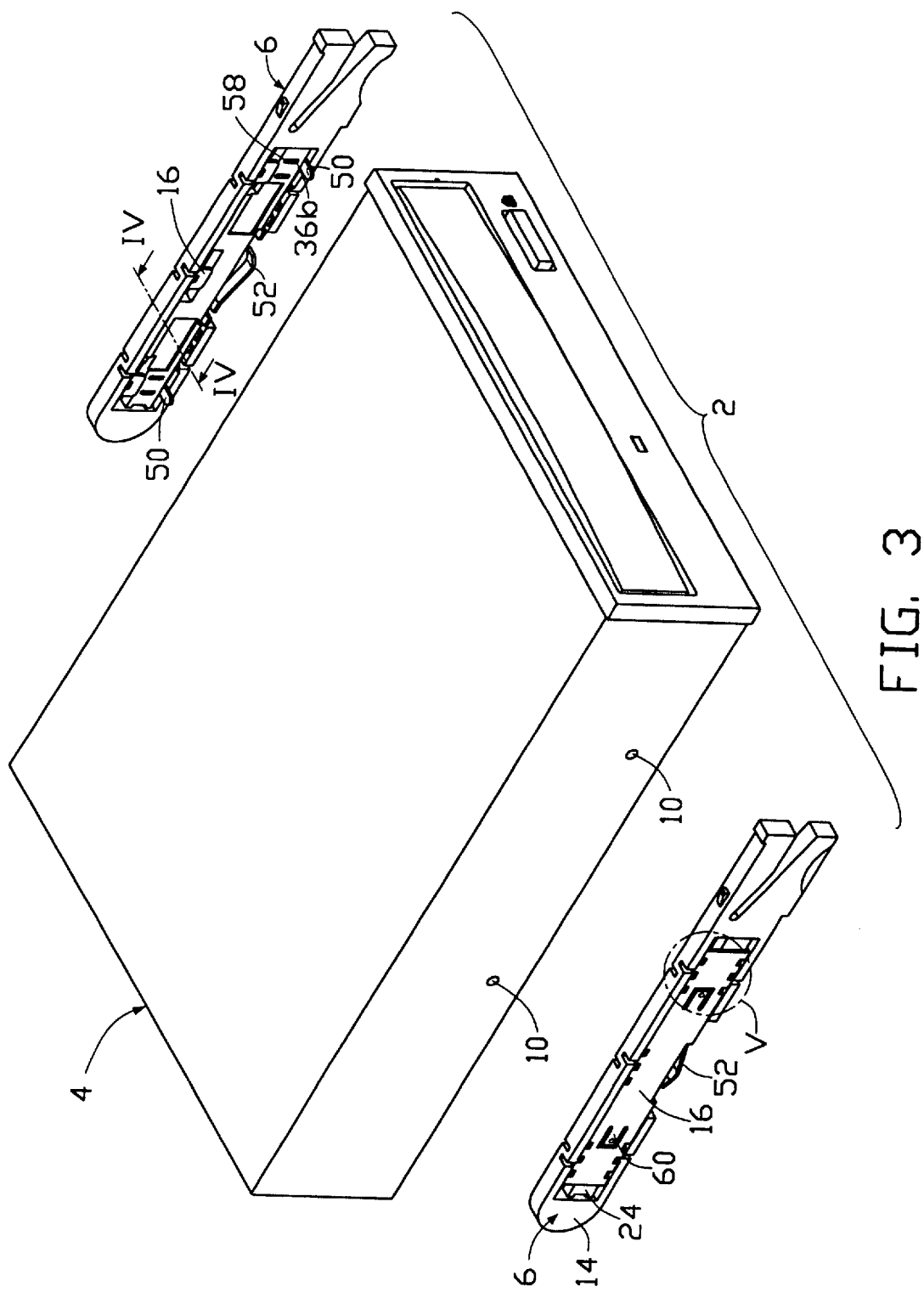
FIG. 3 is a partially assembled view of FIG. 1 showing a pair of fasteners respectively attached to a pair of rails at a first position.
Figure 4:
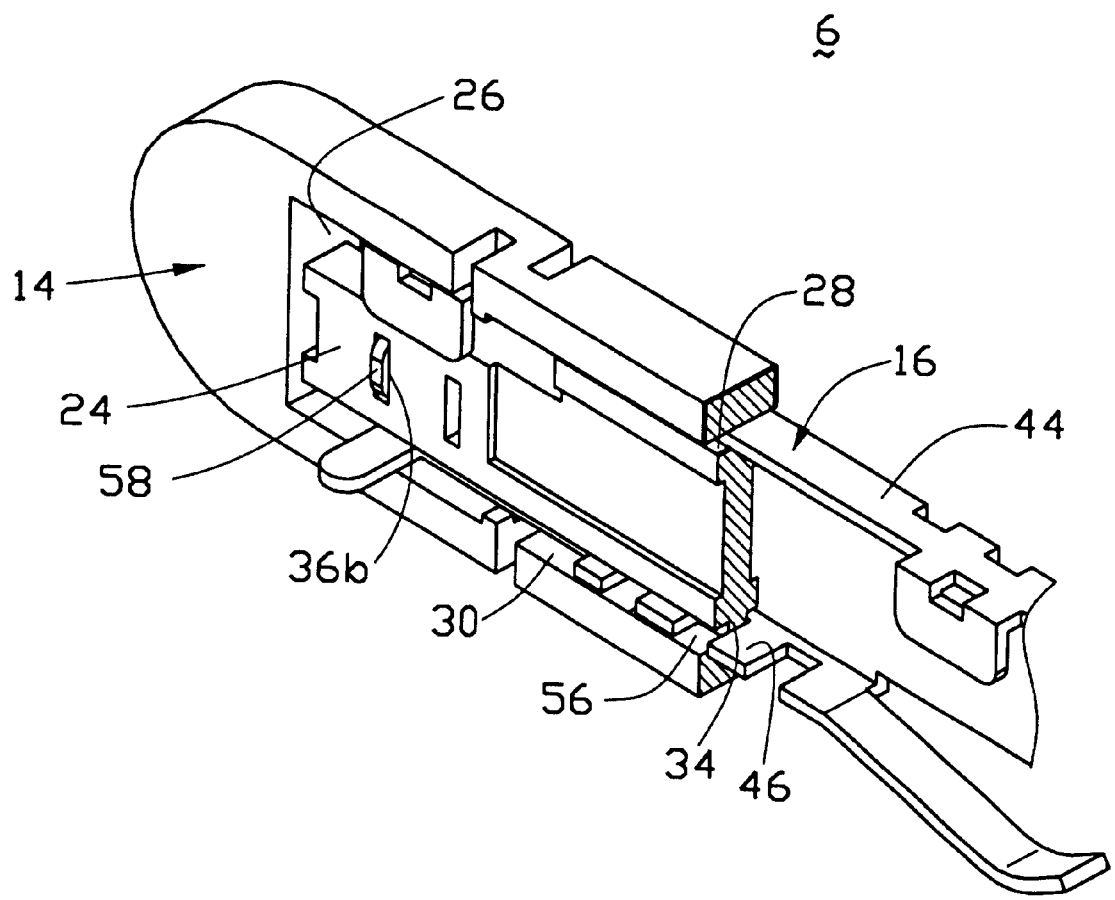
FIG. 4 is a perspective view of the rail assembly with a partial cross-section taken along line IV—IV in FIG. 3.

Referring to FIGS. 3 and 4, the pair of fasteners 16 is securely attached to the recessed walls 24 of rails 14. The top flange 44 of the fastener 16 extends through the openings 26 and the top slots 28 of the rail 14, and the bottom flange 46 of the fastener 16 extends through the bottom slots 30 of the rail 14. The pair of tabs 58 is shown engagingly and selectively extending through the through holes 36b for fixing the fastener 16 to the rail 14. Each partition 34 of the rail 14 is engagingly received in the corresponding gap 56 of the fastener 16 for strengtheningly fixing the fastener 16 to rail 14.

Figure 5:
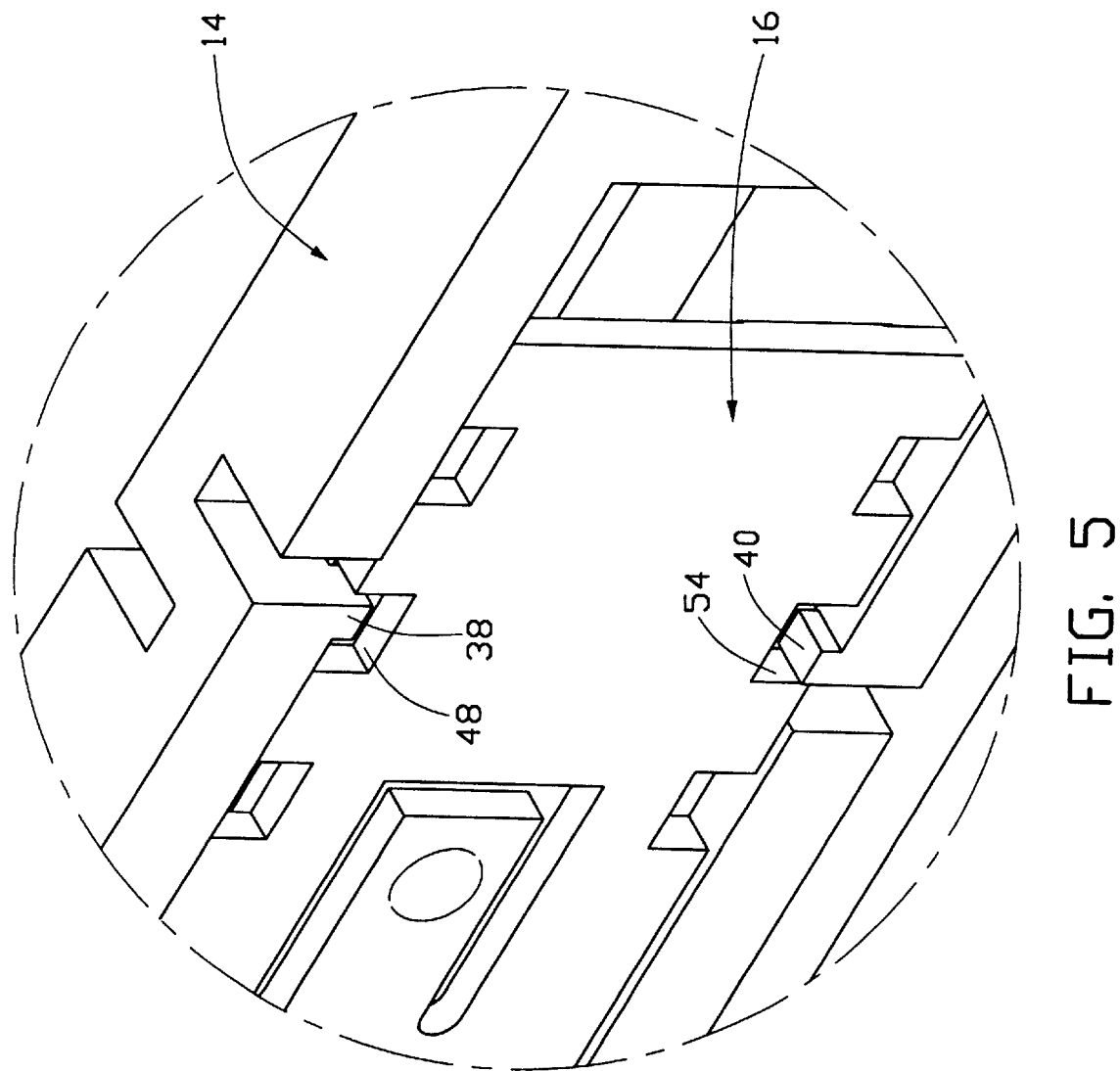
FIG. 5 is an enlarged view of circled portion V in FIG. 3.

Also referring to FIG. 5, each top protrusion 38 of the rail 14 is engagingly received in the corresponding top notch 48 of the fastener 16, and each bottom protrusion 40 of the rail 14 is engagingly received in the corresponding bottom notch 54 of the fastener 16 for further fixing the fastener 16 to the rail 14.

Figure 6:
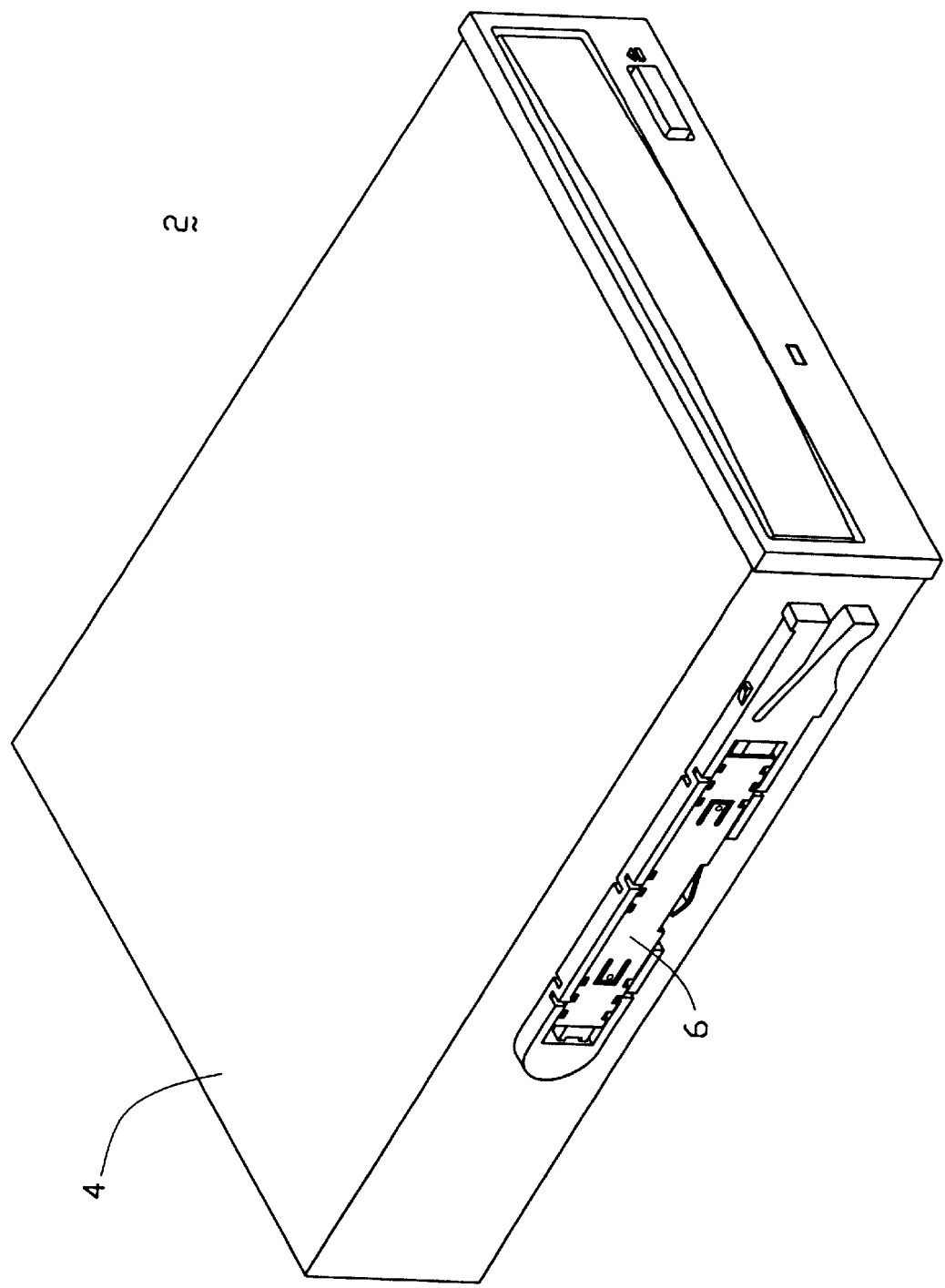
FIG. 6 is an assembled view of FIG. 1.

Referring to FIGS. 3 and 6, the posts 50 of the rail assemblies 6 extend into the apertures 10 of the CD-ROM drive 4 to form the CD-ROM drive assembly 2. Also referring to FIG. 7, the CD-ROM drive assembly 2 is attached to the drive bracket 8 with the latch 20 engaging with a panel 62 of a computer enclosure to which the drive bracket 8 is attached for readily fixing the CD-ROM drive 4 in the drive bracket 8. The tongues 60 and the fingers 52 of the rail assemblies 6 resiliently contact the drive bracket 8 to form grounding paths between the CD-ROM drive 4 and the drive bracket 8.

Figure 8:
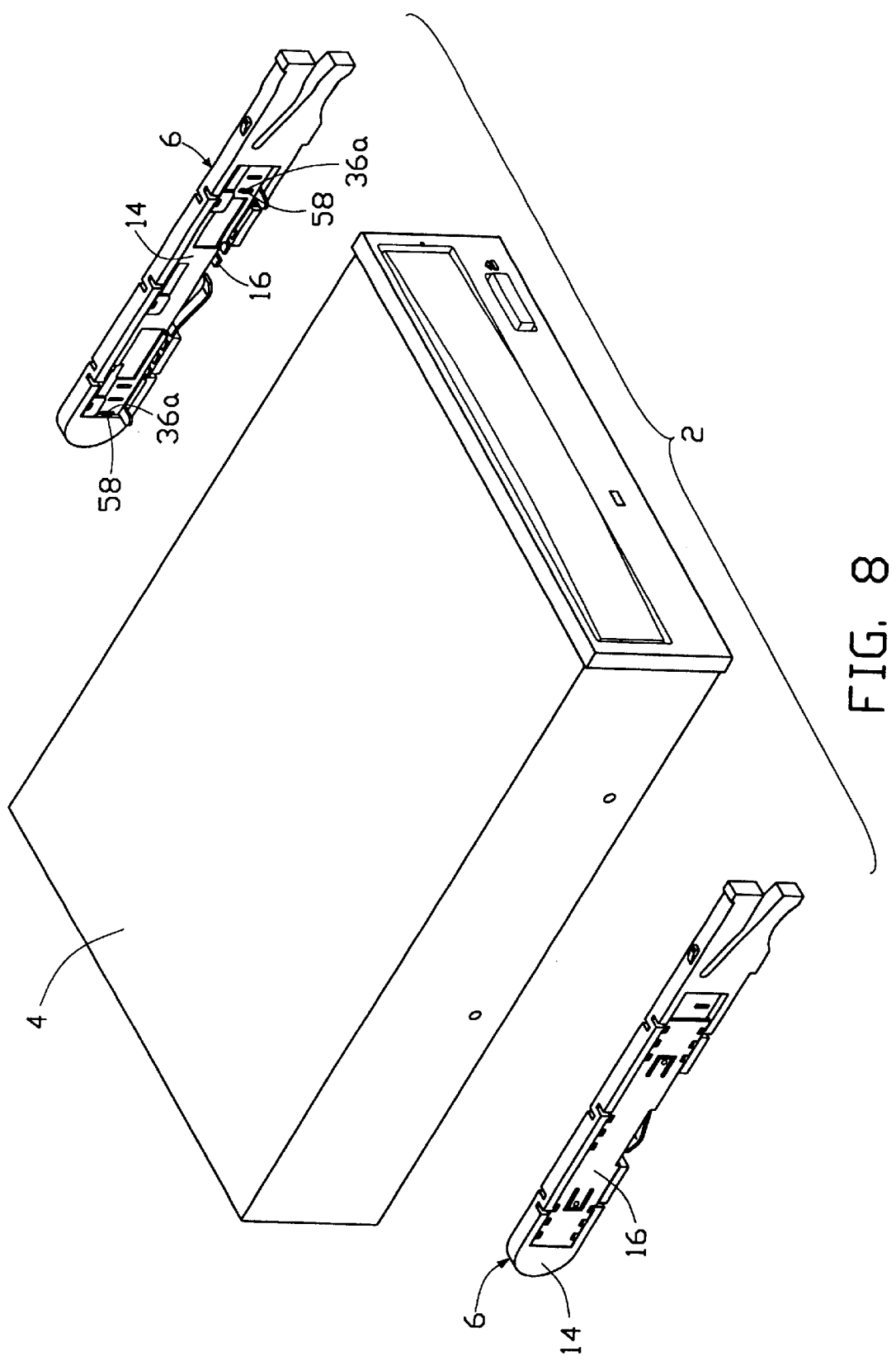
FIG. 8 is similar to FIG. 3 but showing the fasteners attached to the rails at a second position.
Figure 9:
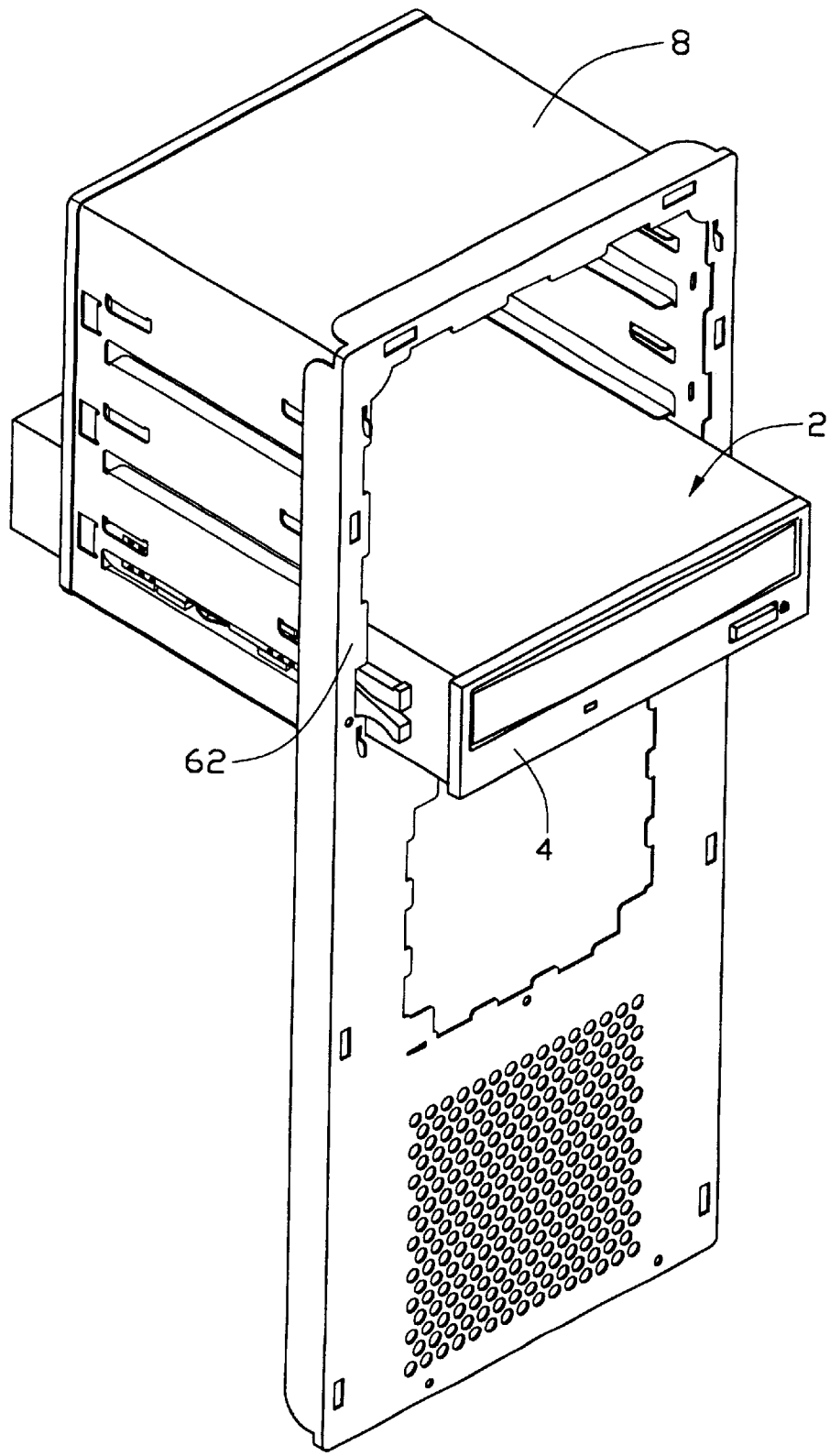
FIG. 9 is similar to FIG. 7 but showing the CD-ROM drive at a second position relatively to the drive bracket.

Referring to FIG. 1, by selectively engaging the tabs 58 of the fastener 16 with the holes 36a, 36b, 36c of the rail 14, the relative position of the rail 14 with respect to the fastener 16 and thus the CD-ROM drive 4 is adjustable. Also referring to FIGS. 8–9, the pair of tabs 58 of the fastener 16 is shown engagingly extending into the through holes 36a of the rail 14. So the rails 14 are moved forwardly relative to the CD-ROM drive 4 as compared to those shown in FIGS. 3 and 6. In other words, the CD-ROM drive 4 is moved rearwardly relative to the panel 62 when the CD-ROM drive assembly 2 is attached to the drive bracket 8. Thus, the position of the CD-ROM drive 4 is adjustable relative to the panel 62. Of course, the tabs 58 may engage with the through holes 36c.

It is understood that the invention may be embodied in other forms without departing from the spirit thereof. Thus, the present example and embodiment are to be considered in all respects as illustrative and not restrictive, and the invention is not to be limited to the details given herein.

What is claimed is:

1. A rail assembly adapted for mounting a data storage device in a computer enclosure, comprising:
    a rail comprising a body to which a resiliently deformable latch is connected, the latch being adapted to engage with a computer enclosure for securing the data storage device in the enclosure, the body defining a pair of through holes and a pair of slots; and
    a conductive fastener attached to the rail for fixing the rail to a data storage device, the fastener comprising a pair of tabs for engagingly extending into the through holes of the rail and a pair of posts movably extending through the pair of slots of the rail to engage with and thus secure the rail assembly to the data storage device.

2. The rail assembly as described in claim 1, wherein the body defines two opposite recesses in opposite faces thereof to form a recessed wall for receiving the fastener on either recess thereof.

3. The rail assembly as described in claim 1, wherein the fastener forms a first flange defining a plurality of first notches, and wherein the rail forms a plurality of first protrusions which are engagable with the first notches for fixing the fastener to the rail.

4. The rail assembly as described in claim 3, wherein the posts extend from the first flange, and wherein the first flange is received in the pair of slots of the rail.

5. The rail assembly as described in claim 3, wherein the first flange defines a plurality of gaps, and wherein the body of the rail forms a pair of partitions which are engagable with the gaps for fixing the fastener to the rail.

6. The rail assembly as described in claim 3, wherein the body of the rail defines a cutout, and wherein the first flange forms a finger extending through the cutout for contacting the computer enclosure and thus forming an electrical path between the data storage device and the computer enclosure.

7. The rail assembly as described in claim 3, wherein the fastener forms a second flange, and wherein the rail defines a second slot for receiving the second flange.

8. The rail assembly as described in claim 7, wherein the second flange of the fastener defines a plurality of second notches, and wherein the rail forms a plurality of second protrusions which are engagable with the second notches for fixing the fastener to the rail.

9. The rail assembly as described in claim 1, wherein the fastener forms a pair of tongues for contacting the computer enclosure.

10. The rail assembly as described in claim 1, wherein the rail defines three pairs of through holes corresponding to three positions, and wherein the tabs of the fastener are alternatively engagable with one pair of the through holes.

11. The rail assembly as described in claim 1, wherein the fastener includes an elongate base and first and second flanges extending from opposite elongate edges of the elongate base, and wherein the tabs respectively extend from opposite ends of the elongate base of the fastener.

12. A data storage device assembly comprising:
    a data storage device defining a pair of apertures in one of two opposite side walls thereof;

a rail attached to the side wall of the data storage device, the rail defining a pairs of through holes; and a conductive fastener attached to the rail for fixing the rail to the data storage device, the fastener comprising a pair of tabs for engagingly extending into the through holes of the rail for fixing the fastener to the rail and a pair of posts extending through the rail to securely engage with and thus fix the rail to the data storage device, a finger extending from the fastener adapted for contacting a computer enclosure for forming an electrical path.

13. The data storage device assembly as described in claim 12, wherein the fastener forms a first flange defining a plurality of first notches, and wherein the rail forms a plurality of first protrusions engagable with the first notches for fixing the fastener to the rail.

14. The data storage device assembly as described in claim 12, wherein the rail defines a cutout for extension of the finger of the fastener.

15. The data storage device assembly as described in claim 13, wherein the fastener forms a second flange defining a plurality of second notches, and wherein the rail forms a plurality of second protrusions which are engagable with the second notches for fixing the fastener to the rail.

16. A data storage device assembly comprising:

a data storage device defining apertures in at least one side wall thereof;

a rail attached to the side wall of the data storage device, the rail defining a plurality of through holes; and a conductive fastener attached to the rail for fixing the rail to the data storage device, the fastener comprising a tab for alternatively engaging with one of the through holes of the rail and a pair of posts extending through the rail to engage with and thus secure the rail to the data storage device.

17. A data storage device assembly comprising:

a data storage device defining at least one side wall thereof;

a rail attached to the side wall;

a conductive fastener attached to the rail;

means for securing the fastener to the data storage with the rail sandwiched therebetween; and means for securing the fastener to the rail in alternate positions along a front-to-back direction of the assembly, wherein the fastener is in a fixed position relative to the data storage device, while the rail is selectively in one of alternate positions relative to the data storage device.

* * * * *